(12) United States Patent
De Ambrosi et al.

(10) Patent No.: US 7,321,034 B2
(45) Date of Patent: Jan. 22, 2008

(54) PROCESS FOR THE PHYSICAL DEPOLYMERIZATION OF GLYCOSAMINOGYLCANES AND PRODUCTS OBTAINED THEREFORM

(75) Inventors: Luigi De Ambrosi, Santhia (IT); Nicola Iannaccone, Pisa (IT); Sergio Gonella, Santhia (IT); Elena Vismara, Milan (IT); Solitario Nesti, Baronto (IT); Giangiaocomo Torri, Milan (IT)

(73) Assignee: Laboratori Derivati Organici S.p.A., Trino Vercelli (IT)

( * ) Notice: Subject to any disclaimer, the term of this patent is extended or adjusted under 35 U.S.C. 154(b) by 0 days.

(21) Appl. No.: 10/518,980

(22) PCT Filed: Jun. 18, 2003

(86) PCT No.: PCT/EP03/06446

§ 371 (c)(1),
(2), (4) Date: May 31, 2005

(87) PCT Pub. No.: WO04/000886

PCT Pub. Date: Dec. 31, 2003

(65) Prior Publication Data

US 2005/0240013 A1   Oct. 27, 2005

(30) Foreign Application Priority Data

Jun. 21, 2002 (IT) .......................... MI2002A1372

(51) Int. Cl.
   *C08B 37/10* (2006.01)

(52) U.S. Cl. .......................... 536/124; 536/21; 536/53; 201/157.63

(58) Field of Classification Search ................. 536/21, 536/53, 124; 204/157.6, 157, 157.63
See application file for complete search history.

(56) References Cited

U.S. PATENT DOCUMENTS 4,987,222 A * 1/1991 De Ambrosi et al. ......... 536/21

FOREIGN PATENT DOCUMENTS

| EP | 0 394 971 A1 | | 10/1990 |
| KR | 2000-0036332 | * | 7/2000 |
| KR | 20000036332 | * | 7/2000 |
| WO | WO 90/04607 A2 | | 5/1990 |

* cited by examiner

Primary Examiner—Shaojia Anna Jiang
Assistant Examiner—Ganapathy Krishnan
(74) Attorney, Agent, or Firm—Leon R. Yankwich; David G. O'Brien; Yankwich & Associates

(57) ABSTRACT

The invention relates to a process for the depolymerization of glycosaminoglycanes characterized by the use of electron beam radiation, optionally in the presence of an organic compound selected from the group consisting of ethers, alcohols, aldehydes, amides and formic acid. The invention also relates to the intermediate depolymerized heparin obtained by the process. The intermediate depolymerized heparin can be dissolved in a buffer solution and fractionated by gel permeation for obtaining the desired molecular weight.

6 Claims, No Drawings

PROCESS FOR THE PHYSICAL DEPOLYMERIZATION OF GLYCOSAMINOGYLCANES AND PRODUCTS OBTAINED THEREFORM

This application is a United States national filing under 35 U.S.C. §371 of international (PCT) application No. PCT/EP03/006446, filed Jun. 18, 2003, designating the US, and claiming priority to Italian Application No. MI2002A001372, filed Jun. 21, 2002.

STATE OF THE ART

Glycosaminoglycanes are natural products of large pharmaceutical interest. Among the most widely used we can mention heparin, dermatan, heparansulphate and chondroitines.

The molecular weight of the natural products varies considerably and normally ranges from 5 to 40 kDa. It is however known that for certain applications lower molecular weights lead to higher pharmacological activity. The high molecular weight of these compounds often renders impossible their oral administration. Furthermore, it is known that specific activities of glycosaminoglycanes are related to relatively short saccharide sequences. Thus, it would be very advantageous to depolymerize glycosaminoglycanes reducing the molecular weight without loosing the active sites present in the molecule.

The chemical depolymerization of glycosaminoglycanes is well known in the art and leads to glycosaminoglycanes of lower MW but also with a lower S content.

EP 394 971 discloses an enzymatic or chemical depolymerization process. The obtained heparin oligomers have a sulphur content lower than 9%.

WO 90/04607 discloses a depolymerization of heparin and dermatansulfate by the use of $H_2O_2$ and $Cu^{2+}$. The ratio $SO_3^-/COO^-$ is slightly lower than in the starting heparin.

U.S. Pat. No. 4,987,222 discloses a method for the depolymerization of heparin by the use of gamma rays. The examples disclose the preparation of heparin of Mw around 5,000 Da and with a high S content.

SUMMARY OF THE INVENTION

The present invention relates to a physical process for the depolymerization of glycosaminoglycanes by the use of electron-beam radiation (EB). It also relates to the glycosaminoglycanes obtained by this process.

DETAILED DESCRIPTION OF THE INVENTION

The present invention provides a physical depolymerization process which reduces the molecular weight of glycosaminoglycanes without substantially modifying the chemical structure of the same.

The objective is achieved through use of electron-beam radiation. When using heparin as a starting material, this process results in a low to ultra-low molecular weight heparin characterized by high S content.

The starting materials to be used in the process according to the present invention are natural glycosaminoglycanes such as heparin, heparansulphate, dermatane and chondroitine. Other suitable starting materials are derivatives of glycosaminoglycanes obtained by known methods. Thus, for example, the N-acetyl or N-sulphate groups of the residues of hexosamine can be transformed into amino groups through N-desulphation or N-deacetylation reactions and the sulphate groups of the uronic acids can give rise to epoxy groups through desulphation reactions.

In another embodiment, it is possible to use as a starting material for the process of the present invention a glycosaminoglycane which has already undergone a depolymerization process either chemical or enzymatic. The use of partly depolymerized glycosaminoglycanes is for example relevant in case of heparin which has undergone an acid pretreatment that has as a side effect partial depolymerization, or when depolymerizing functionalized glycosaminoglycanes. The conditions used for the introduction of functional groups are sometimes also causing reduction of the molecular weight of the polysaccharide.

Thus, not only it is possible to perform both steps by using electron-beam radiation, but it is possible to perform a first depolymerization step by using electron-beam radiation followed by a second step using chemical-enzymatic depolymerization, or to perform a first step of chemical-enzymatic depolymerization followed by electron-beam radiation depolymerization.

The process of the present invention allows reduction of the molecular weight of the glycosaminoglycane without sensible modification of the chemical structure of the polysaccharide.

The dose of radiation used in the depolymerization process depends on several factors, e.g. the type of glycosaminoglycanes, the desired final Mw, the energy of the radiation. In general, the dose of radiation will vary in the range 400-8,000 kGy, preferably 800-6,000 kGy, more preferably 1,200-5,000 kGy.

Preferably, the electron-beam radiation has an energy comprised between 100 and 1000 keV, most preferably between 100 and 500 keV.

The depolymerization process can be performed in a broad range of temperature, it is however preferred to maintain the temperature between 0 and 50° C., most preferably between 20 and 40° C.

The depolymerization process according to the invention is preferably performed in aqueous solution, optionally in the presence of an organic compound selected from the group consisting of alcohols, ethers, aldehydes, amides and formic acid. Preferably, the organic compound is selected from compounds of formula I, II and III.

wherein each R is independently selected from the group consisting of H, OH, CHO, $C_1$-$C_6$ alkyl and acyl, optionally substituted by oxygen atoms; two R groups optionally join together to form a ring.

Preferred examples of alcohols are: methanol, ethanol, n-propanol, isopropanol, n-butanol, isobutanol, glycerol.

Preferred examples of ethers are: tetrahydrofurane, dioxane, diethylether, tertbutylmethylether, dioxolane.

Examples of aldehydes are formaldehyde, glyoxal, acetaldehyde or stabilized forms thereof (trioxane, glyoxal trimeric dihydrate).

Preferred examples of amides are: N,N-dimethylformamide, N,N-dimethylacetamide, N,N-diethylformamide, N-methylpyrrolidone.

The concentration of glycosaminoglycane in the solution to be submitted to radiation can vary in a broad range. Preferably it is comprised between 2 and 25% w/v, more preferably between 5 and 15%.

After irradiation, the solutions are optionally discolored either by using an oxidizing treatment or by passing them on proper resins. The solution is then generally purified by precipitation in hydrophilic solvent. The obtained paste can be redissolved in water and lyophilized by vacuum distillation.

It is also possible to fractionate the intermediate depolymerized glycosaminoglycane by Gel Permeation Chromatography. The fractions containing the desired molecular weights are collected, concentrated by ultra filtration and lyophilized.

The process of the present invention is preferably performed by using a dynamic irradiation process.

With the term "dynamic irradiation process" it is meant a process wherein the irradiation is performed on a thin layer of liquid which is fluxing in front of the electron-beam window. In this way, the efficiency of the irradiation process is increased.

The process can be performed either in batch or in continuous mode. The apparatus is preferably formed of a reservoir from which the liquid moves to the irradiation area. The liquid is then returned to the reservoir.

The exposure of the solution to the electron stream can take place in different ways:
  in front of the window an inclined plane is placed, on which a thin layer of solution flows,
  in front of the window can be placed a system of thin pipes which allow the exposition of the solution to the electrons,
  the solution can flow directly on the window.

The optimal conditions of irradiation are determined through preliminary dosimetry.

The dosimetry has been performed considering the typical conditions of irradiation of the solution in terms of:
  a) properties relating to the beam of electrons, i.e.
     beam energy (measured in keV)
     beam current (measured in mA);
  b) properties relating to the geometry of the irradiation, i.e.
     distance beam source-solution to process,
     presence of possible shields or other nearby material that can be source of secondary radiation.

The dosimetry is in any case performed for a limited period of time, since the dose administered to the material is directly proportional to the time of the exposition and is determined in static conditions, while in reality the process is dynamic.

Experimental Section

Characterization of the Products

Molecular weight (Mw) was determined by size exclusion chromatography (European Pharmacopoeia $4^{th}$ ed.: 2.2.30 e 2.2.46 for chromatographic techniques and 01/2002:0828 p. 1297 for method).

β-rays Irradiation

The solution irradiation process takes place inside an electron-beam apparatus.

The beam is generated by a hot cathode, constituted of a tungsten filament to whom a high voltage is applied.

The beam generation area is posed under vacuum. Such a vacuum is obtained by the combined action of two pumps, a mechanical one and a turbomolecular one.

The aspiration generated by these two pumps allows the achievement of ideal conditions for the free circulation of electrons which otherwise would be slowed down by the air present around the cathode.

The beam reaches the region outside the chamber where it is generated passing through a very thin titanium film (thickness 10 μm). By their passage X rays are also generated. The solution to be irradiated is placed immediately outside this titanium film, at a distance conveniently as small as possible so that the beam exiting the film is not significantly attenuated and thus the use optimised without useless wastes.

The solution to be irradiated is circulated in proximity of the windows from where the beam exits and it is directly exposed to it. The circulation circuit is provided with an external pumping system. The solution is continuously circulated inside and outside the shielded area and therefore can be regularly sampled and fresh solution for processing can be added.

EXAMPLE 1

One liter of 10% sodium heparin solution, free of heavy metal was prepared. The solution was transferred to an electron beam apparatus and the circulation was started in mobile descending phase, over porous glass wool tissue of 1 mm thickness, with a flow rate of 10 l/h by using a peristaltic pump.

Starting the EB irradiation at 5 mA and 300 keV, the cooling system was activated in order to maintain the temperature between 25 and 35° C. The depolymerization was monitored by collecting samples, at fixed intervals, and the molecular weight of the composition was determined. The variation in time is shown in Table 1.

The electron beam was stopped and the collected solution was then spray-dried to obtain the intermediate product which was fractionated by gel permeation.

TABLE 1

| Minutes | >10.000 Da | kGy   | Mw    |
|---------|------------|-------|-------|
| 0       | 30%        | —     | 8.364 |
| 5       | 17%        | 134   | 5.941 |
| 10      | 12%        | 268   | 5.050 |
| 15      | 9%         | 402   | 4.523 |
| 30      | 4%         | 804   | 3.682 |
| 45      | 2%         | 1.206 | 3.240 |
| 60      | 1%         | 1.608 | 3.014 |

EXAMPLE 2

The example was conducted under the identical conditions of example 1, but with an intensity of current of 10 mA.

At the end, the electron beam is stopped and the collected solution undergoes spray-drying to obtain the intermediate product which is fractionated by Gel Permeation

TABLE 2

| Minutes | >10.000 | kGy | Mw |
|---|---|---|---|
| 0 | 30% | — | 8.364 |
| 5 | 12% | 268 | 4.888 |
| 10 | 7% | 536 | 4.053 |
| 15 | 4% | 804 | 3.526 |
| 30 | 2% | 1.608 | 3.040 |
| 45 | 1% | 2.412 | 2.852 |
| 60 | — | 3.216 | 2.716 |

EXAMPLE 3

The example was conducted under the identical conditions of example 1, but with a beam energy of 150 keV and a current of 5 mA. The results are reported in Table 3.

TABLE 3

| Minutes | >10.000 | kGy | Mw |
|---|---|---|---|
| 0 | 30% | — | 8.364 |
| 5 | 24% | 161 | 7163 |
| 10 | 21% | 322 | 6542 |
| 15 | 20% | 483 | 6337 |
| 30 | 17% | 966 | 5968 |
| 45 | 16% | 1449 | 6333 |
| 60 | 13% | 1932 | 5681 |
| 75 | 10% | 2415 | 5235 |
| 90 | 8% | 2898 | 4806 |

EXAMPLE 4

The example was conducted under the identical condition of example 1, but with the addition of 0.4% v/v of isopropanol. Table 4 reports the obtained results.

TABLE 4

| Minutes | >10.000 Da | kGy | Mw |
|---|---|---|---|
| 0 | 30% | — | 8.364 |
| 5 | 20% | 134 | 6265 |
| 10 | 16% | 268 | 5653 |
| 15 | 12% | 402 | 4851 |
| 30 | 5% | 804 | 3760 |
| 45 | 3% | 1.206 | 3298 |
| 60 | 1% | 1.608 | 3018 |
| 75 | 1% | 2010 | 2855 |
| 80 | — | 2144 | 2780 |

EXAMPLE 5

The example was conducted under the identical condition of example 2, but with the addition of 0.4% v/v of isopropanol. Table 5 reports the obtained results.

TABLE 5

| Minutes | >10.000 Da | kGy | Mw |
|---|---|---|---|
| 0 | 30% | — | 8.364 |
| 5 | 16% | 268 | 5625 |
| 10 | 10% | 536 | 4626 |
| 15 | 7% | 804 | 4043 |
| 20 | 4% | 1072 | 3559 |
| 25 | 3% | 1.340 | 3289 |
| 30 | 3% | 1.608 | 3261 |
| 45 | 1% | 2412 | 2913 |
| 55 | 1% | 2948 | 2921 |

The invention claimed is:

1. A process for the depolymerization of glycosaminoglycanes consisting essentially of:
    exposing an aqueous solution to electron beam radiation, said solution consisting essentially of:
    i) water;
    ii) a glycosaminoglycane; and
    iii) optionally, an organic compound selected from the group consisting of Formula I, Formula II, and Formula III:

(I)

(II)

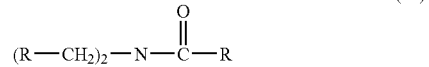
(III)

wherein each R is independently selected from the group consisting of H, OH, CHO, $C_1$-$C_6$ alkyl and acyl, optionally substituted by oxygen atoms; two R groups optionally join together to form a ring, and wherein the concentration of the organic compound is from 0.1% to 5%.

2. The process according to claim 1, wherein said exposing step is performed using a dynamic irradiation process.

3. The process according to claim 1, wherein the glycosaminoglycane is heparin.

4. The process according to claim 1, wherein the electron-beam radiation has an energy of from 100 keV to 1000 keV.

5. The process according to claim 1, wherein the organic compound is selected from the group consisting of methanol, ethanol, n-propanol, isopropanol, n-butanol, isobutanol, glycerol, tetrahydrofurane, dioxane, diethylether, tertbutylmethylether, dioxolane, formaldehyde, glyoxal, acetaldehyde, N,N-dimethyl formamide, N,N-dimethylacetamide, N,N-diethylformamide, and N-methylpyrrolidone.

6. The process according to claim 1, wherein the amount of radiation used is from 400 kGy to 8,000 kGy.

* * * * *